United States Patent [19]

Wielesiuk

[11] 4,338,073
[45] Jul. 6, 1982

[54] APPARATUS FOR APPLYING POLYMERIC MATERIAL TO A WORKPIECE

[75] Inventor: Aleksander Wielesiuk, Swavesey, England

[73] Assignee: Barwell Machine and Rubber Group Limited, Cambridge, England

[21] Appl. No.: 253,153

[22] Filed: Apr. 10, 1981

[30] Foreign Application Priority Data

Apr. 11, 1980 [GB] United Kingdom ............... 8012052
Jun. 3, 1980 [GB] United Kingdom ............... 8018061

[51] Int. Cl.$^3$ .............................................. B29C 15/00
[52] U.S. Cl. .............................................. 425/115
[58] Field of Search ...................................... 425/115

[56] References Cited

U.S. PATENT DOCUMENTS 3,451,876 6/1969 Edelmann et al. ............ 425/115 X
3,981,654 9/1976 Rood et al. ................... 425/115

Primary Examiner—J. Howard Flint, Jr.
Attorney, Agent, or Firm—Bacon & Thomas

[57] ABSTRACT

The disclosure relates to an apparatus for applying a polymeric covering to a workpiece such as a cylindrical workpiece (10). In order to apply smooth surfaced coating firmly bonded to the workpiece in a single operation the workpiece is rotated in a lathe about an axis (11) and a rubber applying head is traversed parallel to the axis along the workpiece. The head has a freely rotatable tapered feed roller (19) forming a nip with the workpiece to apply polymeric material to the workpiece, a main roller (23) adjacent the feed roller and also forming a nip with the workpiece to pressurise and render plastic the rubber coating applied by the feed roller to masticate and compound the layer, a pressure surface (24) adjacent the main roller and incorporating a retractable plough (25) to dig into the rubber coating and release any entrapped air and a finish roller (26) to apply the required surface finish to the rubber coating. All the rollers are so angled in relation to the direction of travel of the head and the axis of rotation of the workpiece that they rotate automatically by engagement with the rubber layer on the workpiece to act on the rubber layer as the head is traversed along the workpiece.

18 Claims, 7 Drawing Figures

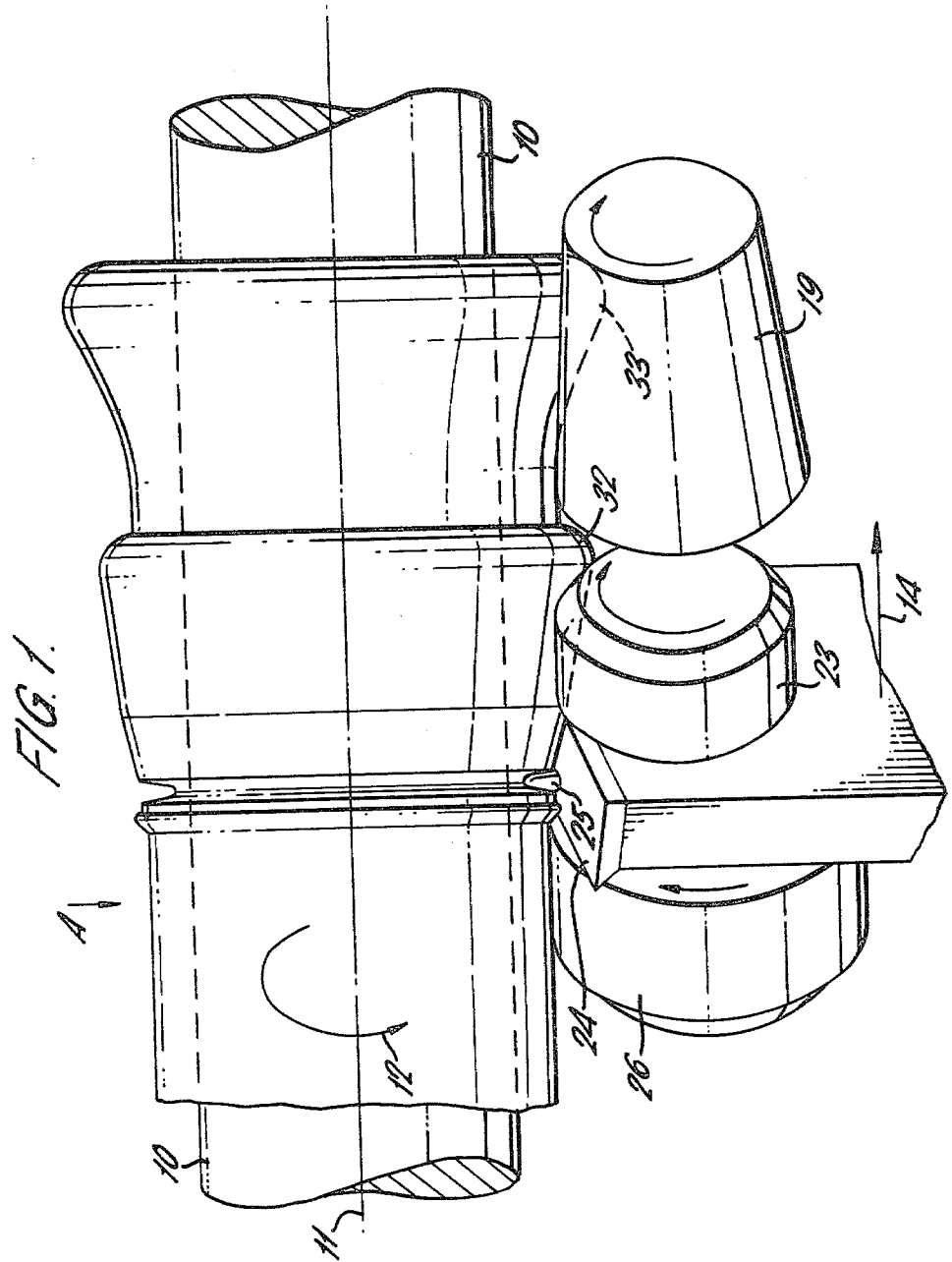

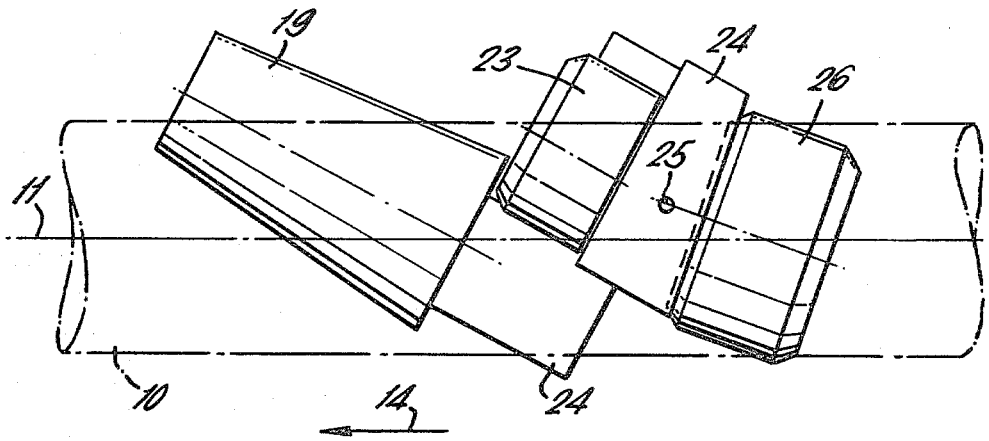
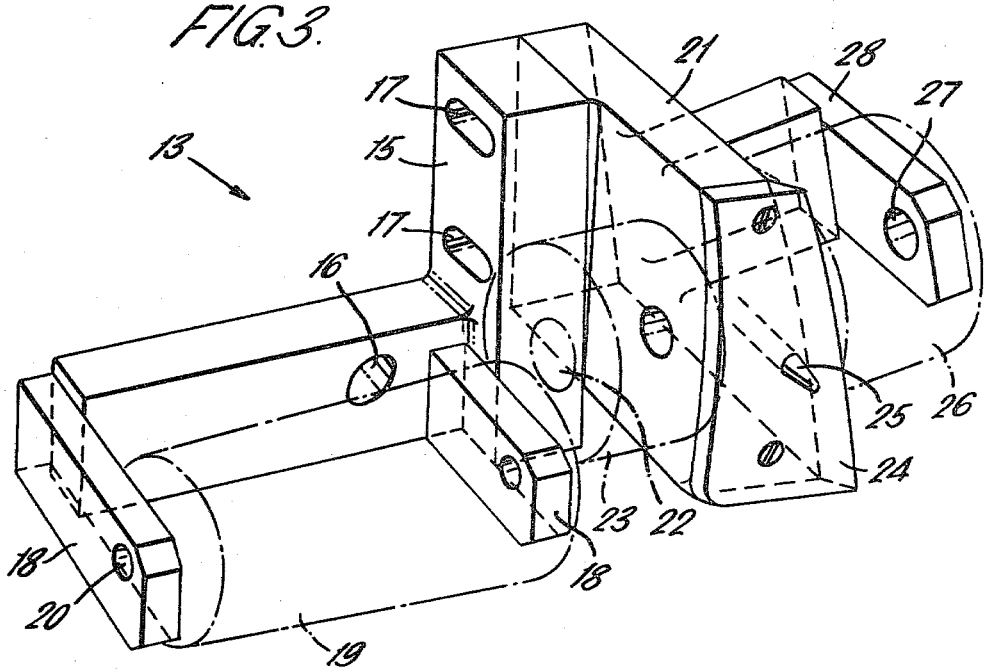

APPARATUS FOR APPLYING POLYMERIC MATERIAL TO A WORKPIECE

BACKGROUND OF THE INVENTION

1. Field of the Invention

This invention relates to apparatus for applying a polymeric convering to a circular cross-section workpiece.

2. Description of the Prior Art

It is known to coat rollers with a coating of a polymeric material such as rubber by winding strips of rubber onto the workpiece surface but such methods result in an uneven coating which requires further operations to produce a required surface finish. It is an object of this invention to provide an apparatus for applying an even polymeric coating to a workpiece such as a roller with a required surface finish in a single operation.

SUMMARY OF THE INVENTION

The invention provides an apparatus for applying a polymeric covering to a workpiece comprising means to support and rotate a workpiece about an axis thereof, main rolling means having a rolling surface for forming a nip with the workpiece surface to render plastic, compound and masticate polymeric material previously applied to a workpiece to form a homogeneous layer of the material around the workpiece surface, advanced rolling means having a rolling surface for forming a nip with the workpiece to apply polymeric material to the workpiece surface prior to action thereon by the main rolling means, final rolling means having a rolling surface for forming a nip with the workpiece surface for finish rolling the polymeric material after operation thereon by the main rolling means and means to guide the three rolling means in a direction parallel to said axis to apply a polymeric coating along the length of the workpiece supported and rotating in said workpiece support means.

Preferably a pressure member having a pressure surface is mounted between the main and final rolling means to adjust the nips formed by the rolling surfaces of the rolling means to engage the polymeric layer between the main and final rolling means.

BRIEF DESCRIPTION OF THE DRAWINGS

FIG. 1 is a plan view of an apparatus for applying a coating of rubber to a cylindrical workpiece;

FIG. 2 is a view looking in the direction of the arrow A of FIG. 1;

FIG. 3 is a perspective view of a part of the apparatus shown in FIGS. 1 and 2;

DESCRIPTION OF THE PREFERRED EMBODIMENTS

Figure 4:
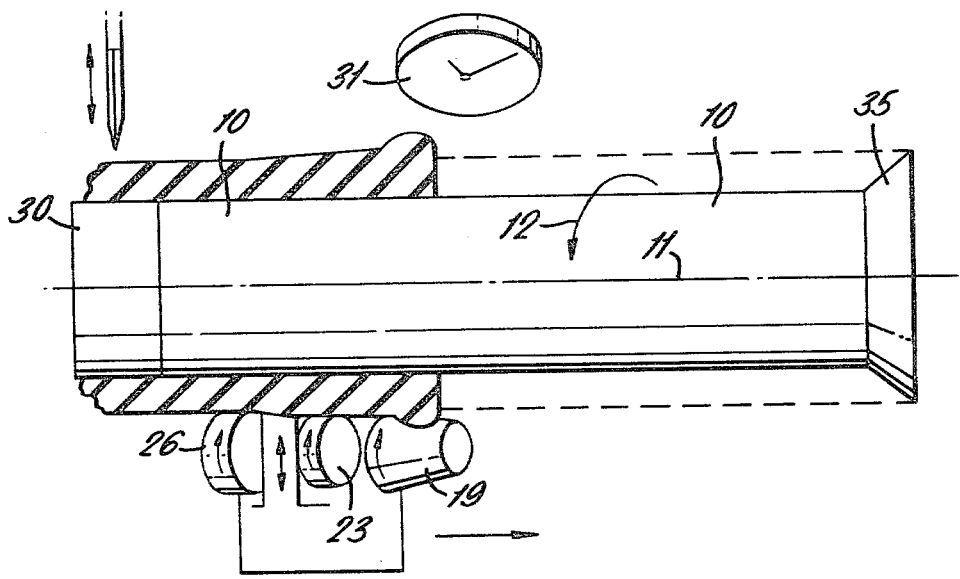
FIG. 4 is a similar view to FIG. 1 showing further details of alternative workpiece support arrangements.

Referring firstly to FIGS. 1 to 3 of the drawings; there is shown a cylindrical workpiece 10 to which a layer of rubber is to be applied. The workpiece 10 is supported in the head and tailstocks of the lathe (not shown) for rotation about the axis 11 in the direction of rotation indicated at 12. A rubber applying head 13 is mounted on the traverse mechanism of the lathe for movement in the direction of the path 14 parallel to the axis 11 of the workpiece. Further details of the lathe and the mounting for the rubber applying head in the lathe will be described with reference to FIGS. 6 and 7. The rubber applying head comprises a main support frame 15 formed with a threaded bore 16 to receive a fixing bolt mounted on the cross-slide of the lathe as described later. A horizontal limb of the frame 15 has a pair of spaced brackets 18 extending towards the workpiece axis 11 between which a tapered feed roller 19 is mounted for rotation on an axle 20 supported at its ends in the brackets 18. The feed roller 19 is intended to apply a supply of rubber to the workpiece as will be described later. The frame 15 has an upright limb formed with spaced horizontally extending slots 17 to which a sub-frame 21 is secured to permit the sub-frame to be adjusted towards and away from the workpiece axis 11 with respect to the main frame 15. On the side of the sub-frame adjacent roller 19 there is a projecting stub axle 22 on which a main roller 23 for pressuring and rendering plastic the rubber coating applied to the workpiece by the roller 19 to masticate and compound the layer to form a homogeneous layer of the required thickness around the workpiece again as will be described later. At the forward end of the sub-frame 21 there is a curved tapered pressure surface 24 for bearing on the rubber layer immediately next to the roller 23. A retractable plough 25 projects from the surface of the pressure plate to dig into the rubber coating and thereby release any entrapped air therein. The plough may be retracted to the level of the surface of the pressure plate 24 when it is not required because the nature of the rubber coating is such that little or no entrapped air is present.

On the opposite side of the sub-frame 21 to the roller 23 there is a final finish roller 26 supported on a spindle mounted at one end on the subframe 21 and at the other end on the bracket 28 projecting forwardly from the rear of the sub-frame 21.

In use the frame 15 is set up on the cross-slide of the laths with the axes of the rollers arranged as can be seen in FIGS. 1 and 2. Thus the roller 19, as viewed in the horizontal plane through the workpiece axis 11 is disposed mainly above the axis 11 with the roller axis tilted upwardly towards the tapered end of the roller. As best seen in FIG. 1 of the drawings, the roller towards its wider end forms a convergent nip with the surface of the workpiece 10. The roller 23 like roller 19 is mounted generally above a horizontal plane containing the workpiece axis 11 as can be seen in FIG. 2. Furthermore, like roller 19, the axis of rotation of the main roller 23 is tilted upwardly from the horizontal and is generally parallel to the axis of rotation of roller 19. Roller 26 is mounted generally level with the workpiece and again its axis is tilted upwardly in the direction of movement of the roller along the workpiece.

The apparatus is used to apply a rubber covering to the workpiece in the following manner. Firstly sheets of rubber are heated in a warming chamber and then dried and sliced into strips which are then preserved at temperature on a hot plate ready for use. The surface of the workpiece 10 is degreased in a chloro-ethylene vapour tank, ground using a traversing belt grinder, or shot-blasted and then degreased again. The surface is then treated with primer paint bonding agent and a solution either by hand or by spray. The workpiece is then mounted in the lathe. For a shafted workpiece, the workpiece may be chucked directly in the head and tailstocks of the lathe. For a non-shafted workpiece, the workpiece ends are supported in special mandrels of similar diameter to the workpiece to effectively extend the end of the workpiece. This arrangement may also be used for shafted work pieces. One such end support mandrel is indicated in the left-hand view of the workpiece at 30 on FIG. 4.

The rubber applying head is positioned to accept initial feed-strips of rubber with the finish roller 26 level with the leading of the end support 30. The lathe is then switched on to start rotation of the workpiece. Strips of rubber are fed between the main roller 23 and the rotating workpiece whilst moving the head to give the required covering thickness as shown by an indicator dial reference 31 on FIG. 4. Feed-strips of rubber are added until a consolidated bank of compound 32 builds up to approximately half the length of the tapered roller 19.

The traverse mechanism for the cross-slide is then engaged to start the head moving along the workpiece and at the same time the plough 25 is slowly extended from the pressure plate 24 to a depth of approximately two/thirds of the depth of the rubber layer applied to the workpiece.

Further strips of rubber are from time to time added between the roller 19 and the workpiece to maintain a secondary bank of compound 33 joining but separate from the bank 32. The bank 33 serves to maintain an even compound supply to the roller 23 as the covering head is traversed along the workpiece. As the head is moving along the workpiece the rollers are automatically rotated by engagement with the rubber covering due to the angle of inclination of the rollers with respect to the workpiece axis 11 as can be seen in FIG. 2. The roller 19 serves to provide a feed stock of rubber on the workpiece surface to feed to the main roller 23. The main roller 23 is so set that the rubber between it and the workpiece is rendered plastic at the nip between the roller surface and the workpiece with the resulting action of the roller on the rubber masticates, compounds and forms the rubber to the required thickness. The plough 25 penetrates the rubber layer so formed to release any entrapped air from the rubber which would weaken the rubber layer and the pressure plate behind the projection ensures that the rubber layer is not lifted away from the workpiece by the action of the plough. The final roller 26 finally forms the surface of the rubber layer and may, if required, impose a pattern for other surface effects required on the covering.

Towards the completion of the covering of the workpiece but before final run-out, the plough 25 is gradually withdrawn. When the finish roller 26 has passed the end support at the other end of the workpiece, the head is wound out from the workpiece. The ends of the rubber coating are then trimmed by a knife 34 leaving an excess of at least one-half inch of the coating at each end of the rubber extending over the workpiece supports 30. The workpiece with its rubber coating is then placed in a rack or stand and location in an auto-clave where it is vulcanised. After vulcanisation, the excess rubber at the ends of the workpiece is trimmed away using a knife.

The right-hand of the workpiece 10 as shown in FIG. 4 of the drawings has a conical end support 35 instead of the plain cylindrical end support. In this arrangement the rubber coating is gradually reduced as it runs out over the conical end support and this provides a cleaner end to be trimmed away by the knife after vulcanisation.

Figure 5:
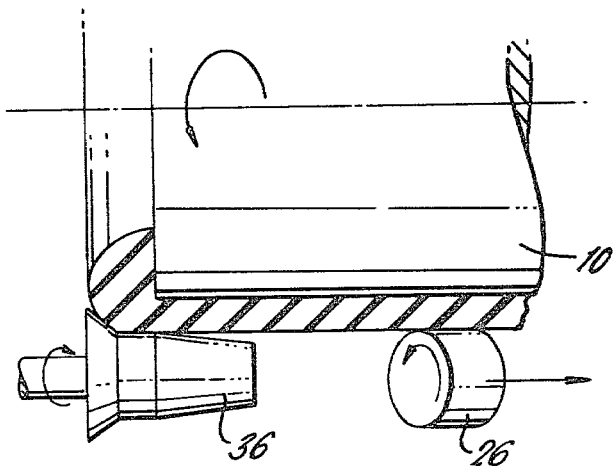
FIG. 5 shows yet a further arrangement.

FIG. 5 of the drawings shows a further arrangement in which reduced diameter end supports are provided which are not shown and further profiled rollers 36 are provided which roll the excess rubber applied at the ends of the workpiece around the ends of the workpiece.

It will be understood that many more modifications may be made to the above described embodiments without departing from the scope of the invention. For example more than one workpiece can be covered in one pass by arranging the workpieces end-to-end with appropriate spacer supports between adjacent workpieces.

The above apparatus can also be used for forming a tube of rubber or other polymeric material which is subsequently severed into individual rings. In this case the shaft 10 merely provides a temporary support for the tubular rubber layer applied to the outer surface of the shaft. After vulcanisation the tube is either cut into individual rings which are then separated from the shaft or the shaft is extracted from the tube and the tube is then severed into individual rings.

The apparatus can also be used to produce a coating having a cylindrical surface on a non-cylindrical workpiece (whether of circular or non-circular cross-section) by appropriately increasing and reducing the amount of rubber fed to and applied by the head as the head moves along the workpiece at a constant distance from the workpiece axis.

Figure 6:
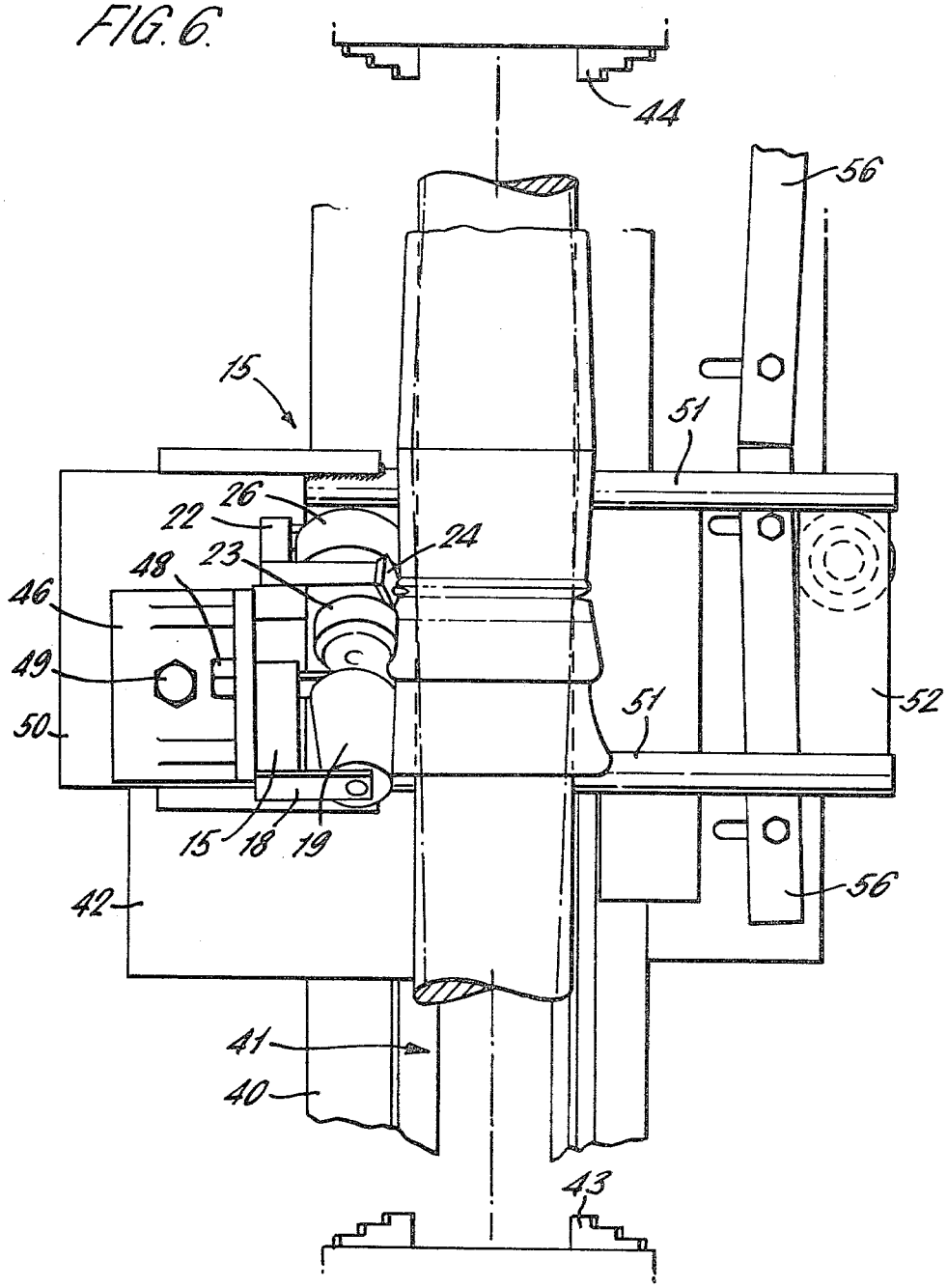
FIGS. 6 and 7 show more details of the apparatus and illustrate a still further embodiment.
Figure 7:
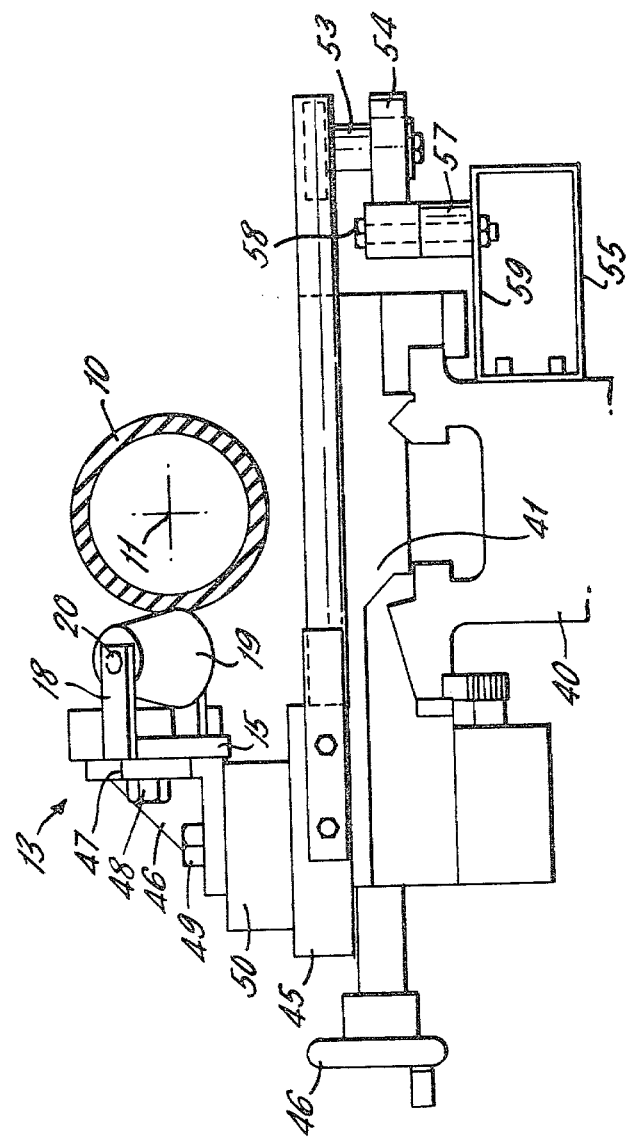

Reference is now made to FIGS. 6 and 7 of the drawings which show the lathe and mounting for the rubber applying head. The lathe comprises a lathe bed 40 providing a slideway 41 on which a saddle 42 is mounted for linear movement. The saddle is driven along the slideway by a conventional motor driven lead screw (not shown). The workpiece 10 to be coated is mounted in chucks 43, 44 or between centres supported in the head and tailstock of the lathe which are not shown. The rubber applying head indicated generally at 13 is mounted at the front of the lathe on a conventional cross-slide 45 which in turn is mounted on a slideway on the saddle. The cross-slide 45 has a nut (not shown) which engages on a lead screw rotated by handwheel 46 for adjusting the cross-slide across the lathe to move the rubber applying head towards and away from the workpiece axis 11 to determine the thickness of rubber applied to the workpiece. The rubber applying head 13 is mounted on the cross-slide by means of an angled bracket 46 having a vertical limb formed with a vertically extending slot 47 to receive a bolt 48 screwed into the aforesaid screw threaded hole 16 in support frame 15. With the bolt 48 loosened, the vertical position of the rubber applying head can be adjusted with respect to the workpiece. The horizontal limb of the bracket 46 is secured by a bolt 49 to a mounting block 50 on the cross-slide. When the bolt 49 is loosened, the rotational position of the rubber applying head can be adjusted in a horizontal plane with respect to the workpiece.

FIGS. 6 and 7 also show a further modification to the apparatus to enable uniform thickness coatings to be applied to workpieces which are not themselves uniform in shape or to enable a coating of varying thickness to be applied to a non-uniform workpiece to produce a coated workpiece having a uniform external shape. For this purpose the nut on the cross-slide 45 is disengaged from the lead screw driven by the handwheel 46 and two rails 51 are bolted to the sides of the cross-slide 45 and extend across the bed of the lathe to the rearward side of the lathe. The ends of the rails 51 are connected together by a tie member 52 and a stud 53 extends downwardly from the lower side of the tie member and carries a cam in the form of a roller bearing 54 at its lower end. A support member 55 is secured to the rearward side of the lathe below the projecting ends of the rails 51 and two template members 56 extending lengthwise of the lathe are secured by bolts with intervening spacers 57 above the upper surface of the support by bolts 58. The bolts 58 engage in slots 59 in the support 55 which extend transversely to the lathe bed to enable the templates to be adjusted laterally of the workpiece. The roller bearing 54 engages the edges of the templates 56 on the opposite side thereof to the workpiece 10 to guide the rubber applying head 13 in accordance with the contour defined by the edges of the templates 56 as the rubber applying head moves along the workpiece. The force imposed on the cross-slide by the workpiece head as it applies rubber to the workpiece automatically holds the roller 54 in engagement with the templates 56. By adjusting the templates 56 towards and away from the workpiece, the roller applying head can be controlled to provide a coating of any required form to the workpiece. In the example shown, the workpiece is crowned towards its centre, that is it has a maximum diameter at its centre and tapers towards its ends and the templates 56 are positioned to maintain the rubber applying head at a constant distance from the periphery of the workpiece as the rubber applying head moves along the workpiece to provide a uniform thickness coating on the workpiece of corresponding profile to the workpiece. The apparatus can also be used for applying a layer of uniform thickness to a workpiece of non-circular cross-section by adjusting the roller applying head using the cross-slide to maintain a constant distance between the head and workpiece as the latter rotates past the head.

I claim:

1. An apparatus for applying a polymeric covering to a workpiece comprising means to support and rotate a workpiece about an axis thereof, main rolling means having a rolling surface for forming a nip with the workpiece surface to render plastic, compound and masticate polymeric material previously applied to a workpiece to form a homogeneous layer of the material around the workpiece surface, advanced rolling means having a rolling surface for forming a nip with the workpiece to apply polymeric material to the workpiece surface prior to action thereon by the main rolling means, final rolling means having a rolling surface for forming a nip with the workpiece surface for finish rolling the polymeric material after operation thereon by the main rolling means and means to guide the three rolling means in a direction parallel to said axis to apply a polymeric coating along the length of the workpiece supported and rotating in said workpiece support means.

2. An apparatus as claimed in claim 1 wherein a pressure member having a pressure surface is mounted between the main and final rolling means to adjacent the nips formed by the rolling surfaces of the rolling means to engage the polymeric layer between the main and final rolling means.

3. An apparatus as claimed in claim 2 wherein a retractable projection is mounted on the pressure member to project from the pressure surface thereof into the polymeric coating between the main and final rolling means to release entrapped air therein.

4. An apparatus as claimed in claim 1 wherein the rolling means are mounted on a common support and means are provided for traversing the support along the workpiece axis with the advance rolling means foremost to apply a layer of polymeric material along the length of the workpiece.

5. An apparatus as claimed in claim 1 wherein the rolling means comprise independent freely rotatable rollers having said rolling surfaces around the periphery thereof.

6. An apparatus as claimed in claim 5 wherein the roller of the advanced rolling means comprises a roller which is tapered, the tapered end of the roller being foremost in the direction of movement of the roller so that the surface of the roller converges towards the workpiece axis at its trailing end to reduce the width of the nip between the roller and the surface of the workpiece.

7. An apparatus as claimed in claim 6 wherein the tapered roller is mounted to rotate about an axis at an angle to the line of movement of the roller parallel to the workpiece axis so that movement of workpiece causes the roller to rotate automatically.

8. An apparatus as claimed in claim 6 wherein the main roller is rotated about an axis at an angle to the line of movement of the roller parallel to the workpiece axis so that the main roller turns automatically as it is traversed along.

9. An apparatus as claimed in claim 6 wherein the finishing roller is mounted about an axis at an angle to the direction of movement of the roller parallel to the workpiece axis so that the roller turns automatically as it is traversed.

10. An apparatus as claimed in claim 6 wherein the final roller has a surface formed to impart the required surface finish to the layer of polymeric material.

11. An apparatus as claimed in claim 10 wherein the final roller has to apply a pattern to the surface of the polymeric layer.

12. An apparatus as claimed in claim 1 wherein extension pieces are provided for mounting the ends of the workpiece in the support means to which the polymeric covering can be applied and then subsequently removed.

13. An apparatus as claimed in claim 12 wherein the extension pieces are cylindrical extensions of corresponding diameter to that of the workpiece ends.

14. An apparatus as claimed in claim 12 wherein the extension pieces are conical members the narrower ends of which correspond in diameter to the diameter of the workpiece ends.

15. An apparatus as claimed in claim 1 wherein additional profiled rollers are provided for rolling excess coating at the ends of the workpiece around the ends of the workpiece.

16. An apparatus as claimed in claim 1 and in the case where the workpiece is cylindrical, wherein the means to mount the workpiece are arranged to mount the workpiece for rotation about the axis of the cylinder and the means to traverse the rolling means move the rolling means along an axis parallel to the cylinder axis.

17. An apparatus as claimed in claim 1 wherein means are provided for adjusting the rolling means with respect to the axis of rotation of the workpiece as the rolling means is traversed along the workpiece to enable the shape of the applied layer to be varied along the workpiece.

18. An apparatus as claimed in claim 1 and in the case where the workpiece has a non-circular cross-section or is circular but with varying diameter along its length wherein means are provided for guiding the rolling means at a constant distance from the axis about which the workpiece is rotated so that by varying the rate of supply of rubber to the workpiece, a cylindrical surface is formed on the workpiece.

* * * * *